United States Patent
Rizzi et al.

[11] 3,746,315
[45] July 17, 1973

[54] MIXING AND TRANSPORTING DEVICE AND METHOD OF MIXING AND TRANSPORTING

[75] Inventors: Marc A. Rizzi, Orange; James Cutarelli, Shelton, both of Conn.

[73] Assignee: USM Corporation, Boston, Mass.

[22] Filed: Dec. 28, 1970

[21] Appl. No.: 101,749

[52] U.S. Cl. .................................. 259/21, 259/192
[51] Int. Cl. ............................................. B01f 7/08
[58] Field of Search .......................... 259/21, 8, 6, 7, 259/22, 23, 24, 41, 42, 43, 44, 185, 186, 187

[56] References Cited
UNITED STATES PATENTS
2,067,458  1/1937  Nichols ................................ 259/187
3,361,537  1/1968  Ferrante .................................. 259/8
3,417,968  12/1968  Schlecht .................................. 259/7
3,352,543  11/1967  Niederman ............................ 259/44
3,592,444  7/1971  Arvanitakis ........................... 259/44

Primary Examiner—Robert W. Jenkins
Attorney—Richard A. Wise, Richard B. Megley and Vincent A. White

[57] ABSTRACT

A device for mixing dry and liquid materials deposited in a hopper including blades rotated in the hopper and disposed to spread the materials on the wall of the hopper spirally to wet and initially mix the materials and to roll the mixture spirally along the wall for transport through an outlet. A method is also provided for mixing and/or transporting viscous material by spreading the material on a surface and/or rolling the material along the surface for discharge.

31 Claims, 4 Drawing Figures

Inventors
Marc A. Rizzi
James Cutarelli
By their Attorney
Vincent A. White

3,746,315

MIXING AND TRANSPORTING DEVICE AND METHOD OF MIXING AND TRANSPORTING

BACKGROUND OF THE INVENTION

In the manufacture of certain plastic articles, it is frequently necessary to combine dry and liquid materials which must be thoroughly mixed so as to react properly either confined in a mold or as an extruded form. Obviously, improper mixing can drastically affect the physical properties of the resulting reacted product. Thus, any mixing device used for the purpose must be capable of thoroughly mixing the materials involved.

It is well-known that the inclusion of fibers especially of glass greatly increases the strength of molded plastic articles. However, it is essential that the length of the fibers and fiber bundle integrity be maintained or the reinforcing qualities of the fibers are largely lost. Where glass fibers are used, the danger of fiber breakage is great because of the brittleness of glass. Thus, while it is essential that any mixing device utilized must thoroughly mix the materials involved, it is also essential that, where glass or similar fibers are included, the mixing action must be gentle and not involve high shearing forces or violent mechanical working that would tend to break the fibers into ineffective short lengths.

In the past, liquid or paste-like resins have been mixed with such fibers into a dough-like mixture in discontinuous batch-type mixers with low speed agitation by stirrer or shear blades. This type of operation generally required bulk storage of such pre-mixtures apart from the actual molding operation, resulting in substantial manual handling. Furthermore, such a procedure does not lend itself to the economies possible in a continuous mixing process set up at the point of use such as at an automatic injection molding machine. It is known to use a screw-type plasticator-extruder both to mix the materials as well as to extrude the mixtures. However, use of such equipment is generally limited to the plastication of thermoplastic resins and, when used with normally liquid thermosetting type resins, the fibers may be chopped into ineffectual lengths and/or insufficiently wetted. It also frequently occurs that the fibers tend to form clumps in the mixture with ineffective dispersion of the fibers in the resulting product.

One mixing device presently available is described in co-pending application, Ser. No. 69,530 filed Sept. 4, 1970. Such a mixer comprises a rotating plate having a face forming one side of an annular mixing chamber, the other side of which is formed by a fixed surface. The fixed surface has a central opening through which dry ingredients, which may include reinforcing fibers, are deposited on the rotating plate and are carried outwardly along the plate by centrifugal force. A liquid ingredient of the mix is sprayed on the materials to wet the dry ingredients, forming a viscous mixture. The relative motion between the plate and fixed surface causes the mixture to be further mixed by a rolling action which does not tend to break the fibers and directs the mixture toward the outlet. Such a mixer overcomes many of the above objections but involves careful manufacture of the mixer with a resultant relatively high cost.

Accordingly, it is an object of the present invention to provide an improved mixing device which utilizes the advantages of mixing dry and liquid ingredients with a rolling action by a mechanism which is simple in construction and relatively low in cost as compared to mixers heretofore available. To this end, a hopper is provided into which the dry and liquid materials are continuously deposited. Blade means rotate within the hopper and are so disposed as to spread the dry and liquid materials on the wall of the hopper in a smearing action which wets the dry materials with the liquid. The materials are spread on the hopper wall in a spiral direction which leads toward a discharge opening in the hopper. After the materials are wetted and initially mixed by the smearing action, the blade means rolls the mixture spirally along the wall for additional thorough mixing as well as for conveyance toward the discharge opening.

According to one feature of the invention, the hopper is provided with a feed screw into which the blade means rolls the thoroughly mixed materials for forcible conveyance through the discharge opening.

According to another feature, the feed screw is rotated at a lower speed than the blade means to cause the mixture to build up in the hopper for greater mixing action. The speed of the screw may also be variable to vary the mixing action depending on the requirements of the materials involved. Further, the screw may be intermittently operated to provide intermittent discharge of the mixed material.

It is another object of the invention to use the above device as a transport mechanism. To this end, viscous material is deposited in the hopper and is rolled by the blade means spirally along the hopper wall to the discharge opening. A feed screw may be provided for positive discharge and may be operated intermittently to discharge charges of the material deposited in the hopper which acts to accumulate continuously deposited material.

Another object of the invention provides a method of mixing dry and liquid materials by spreading the materials along a surface for wetting and thereafter rolling the mixed materials along the surface for discharge. The method also contemplates providing a transporting function for viscous material alone or as a continuation of a mixing function.

While the following description of a preferred embodiment is directed to the mixing and transport of materials which are later reacted for forming plastic articles, it should be apparent that the usefulness of the mixing device is not so limited and may be used to mix and/or transport a wide variety of dry and liquid materials for use outside of the field of plastic manufacture.

Figure 1:
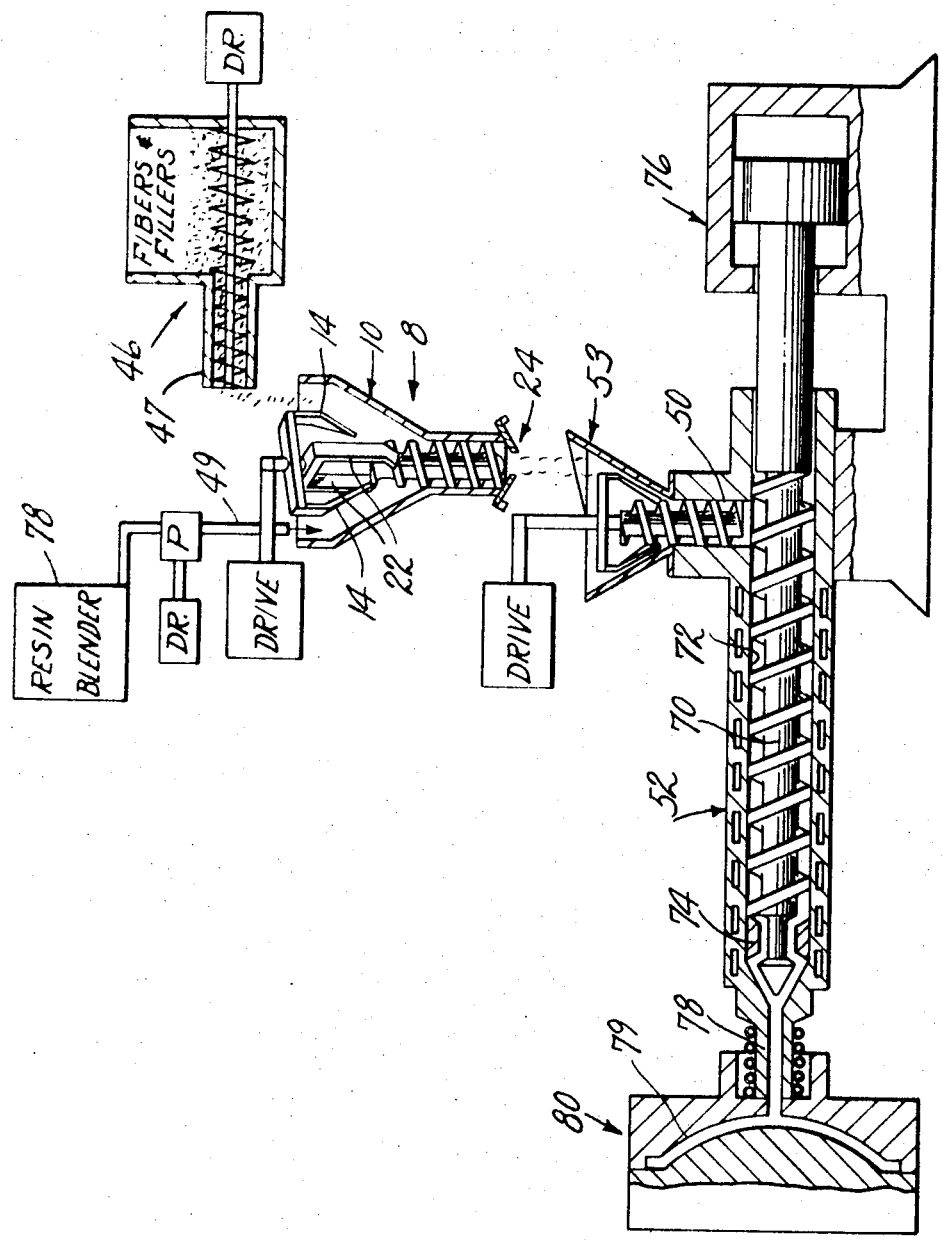
FIG. 1 is a diagrammatic view of an apparatus for molding plastic articles and embodying the mixing unit of the present invention.

There is diagrammatically shown in FIG. 1 an apparatus for injection molding plastic materials from mixtures which may include liquid polymers, such as polyester, phenol formaldehyde, urea formaldehyde, melamine formaldehyde, epoxy and other resins; fillers, such as calcium carbonate, asbestos and clay; reinforcing fibers, such as glass, asbestos, sisal and other natural and synthetic fibers; and other additives such as catalysts, lubricants and thickening agents. Certain polymers, however, which are normally solid or excessively viscous may need to be heated to maintain them in a sufficiently liquid state suitable for mixing and handling in the apparatus without departing from the scope of the invention. The materials generally identified above are cited by way of examples of typical materials which may be mixed according to the invention herein described and obviously could include a wide variety of resins, fillers and reinforcing agents. In general, such materials when mixed form a tacky, dough-like, so-called thermosetting mixture which may be reacted chemically as initiated in a variety of ways depending on the materials used. A similar system is described in co-pending application Ser. No. 101,791 filed Dec. 28, 1970 to which reference may be had for a more complete description of a system with which the present mixer may be used.

Figure 2:
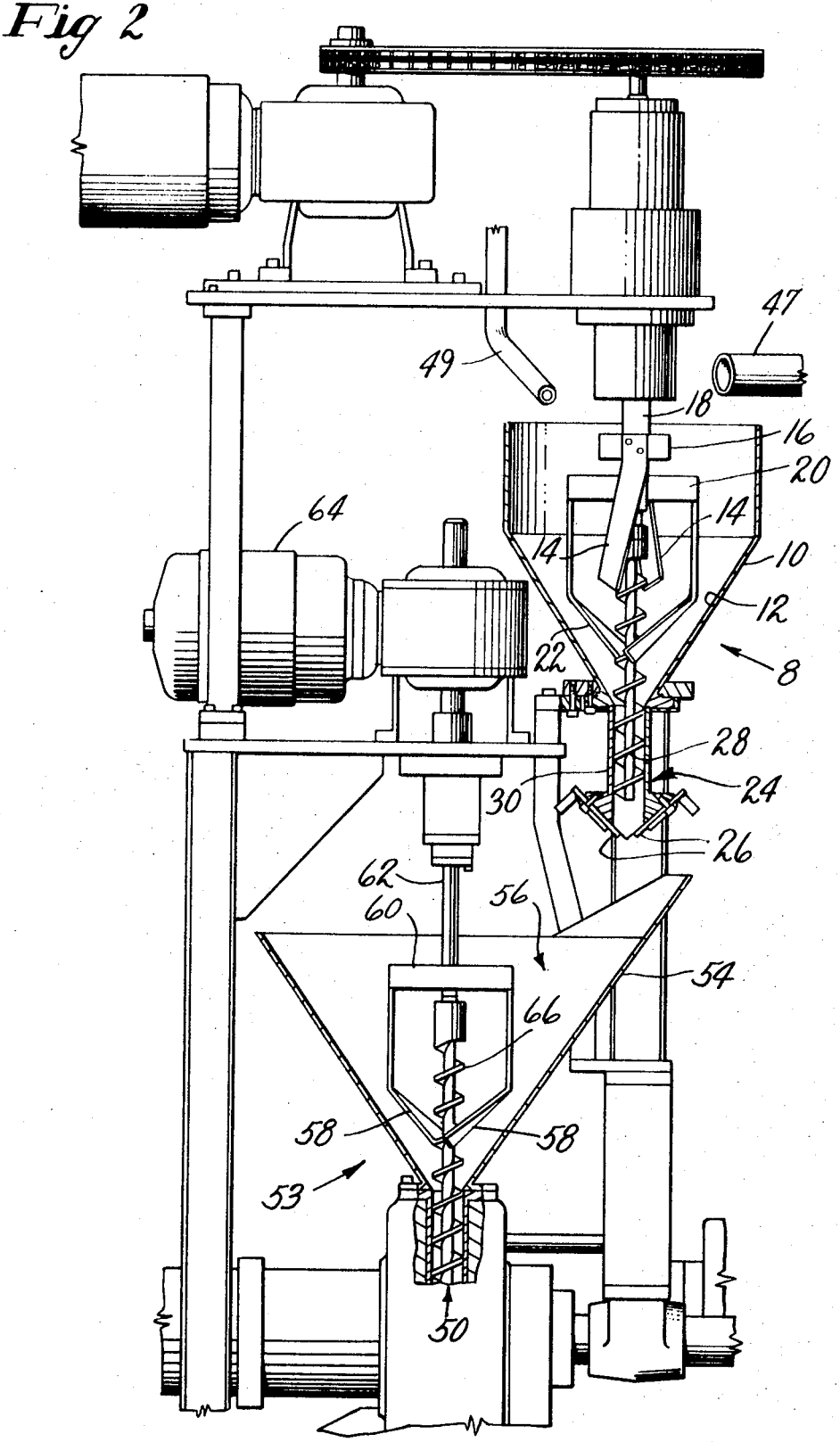
FIG. 2 is a side elevation, partly in section, showing the mixing unit and a transfer unit of the apparatus.
Figure 3:
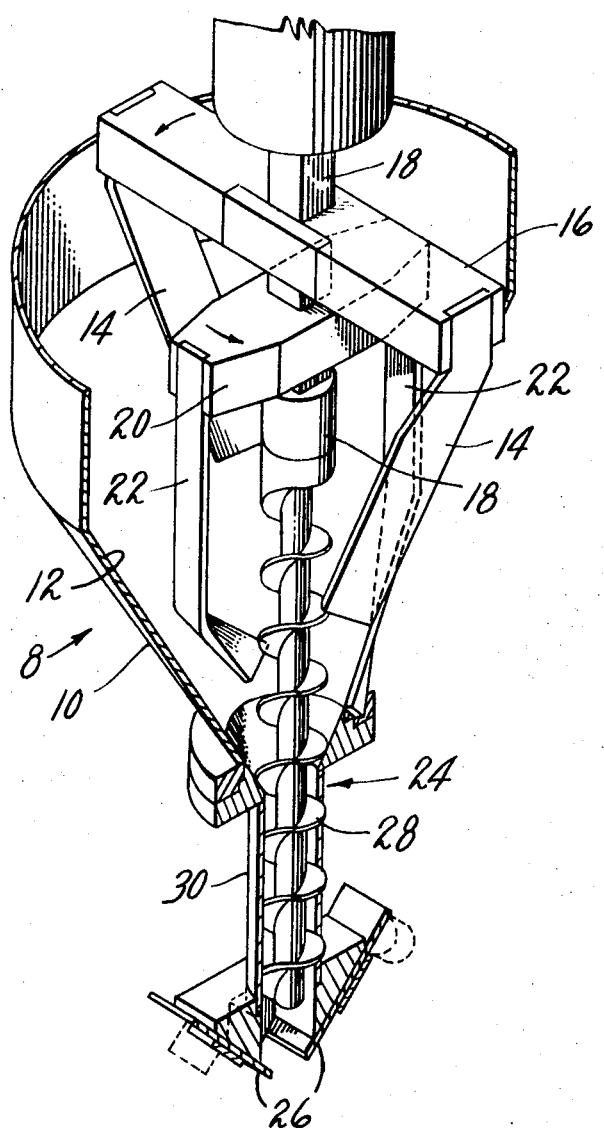
FIG. 3 is an angular view of the mixing unit with the hopper wall broken away.
Figure 4:
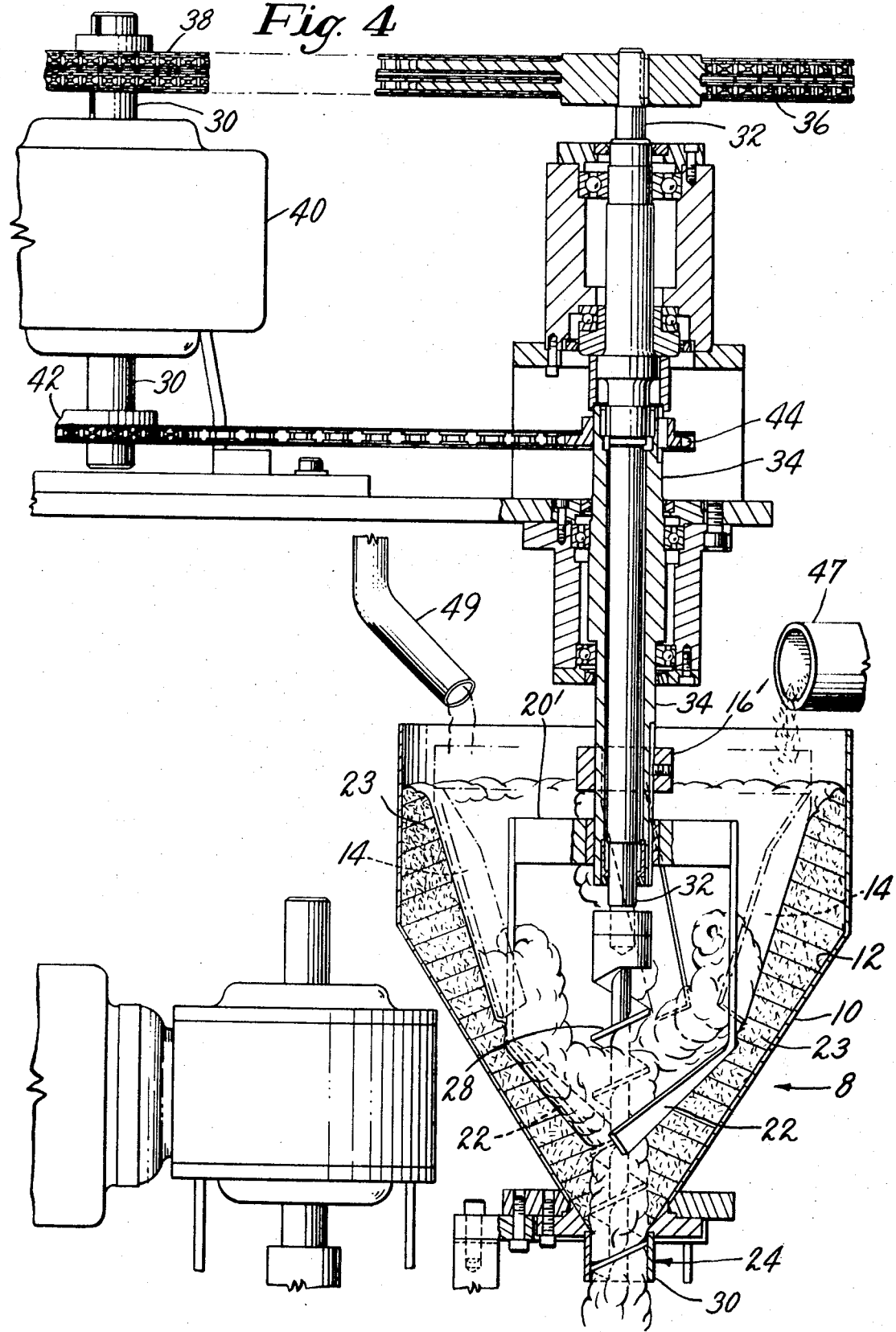
FIG. 4 is an enlarged side elevation of the mixing unit, partly in section, showing an alternate form of drive mechanism, and showing the mixing action involved.

The apparatus described hereafter includes a device for mixing such materials some of which are essentially dry and not easily wetted by the liquid ingredients. In addition, such materials even when wetted from a tacky, dough-like mass which is not readily mixed and which resists transport. Referring to FIGS. 2 - 4 there is shown a mixing device 8 embodying the present invention and which includes a hopper 10 in the form of an inverted truncated cone. The upper end of the hopper is open for deposition of dry as well as liquid materials, as shown diagrammatically in FIG. 1. The dry and liquid materials are spread on the wall 12 (FIGS. 2 - 4) of the hopper in a smearing action by blades 14 mounted for rotation inside the upper end of the hopper. To this end, the blades are mounted on a crossbar 16 secured to a shaft 18 extending into the hopper so the hopper wall 12 is concentric therewith. The blades converge toward the shaft as they extend downwardly toward the lower, narrow end of the hopper with the lower ends of the blades at an angle trailing behind the upper end, considered in the direction of rotation of the blades. The blades also are twisted toward their lower ends to form an angle with the wall adapted to spread the dry and liquid materials along the hopper wall in a smearing action which wets the dry materials with the liquid. As seen in FIG. 3, the shaft is rotated in a counterclockwise direction so that, due to the trailing disposition of the blades, the materials are spread along the wall in directions spiraling toward the lower and narrow end of the hopper. At the lower ends of the blades, the material tends to build up, as best seen in FIG. 4, and is then rolled by the blades also in the same spiral direction.

The shaft 18 (FIGS. 2 and 3) also has secured thereto another crossbar 20 shorter than the crossbar 16 so that another depending set of blades 22 carried at the outer ends of the bar 20 is below and diametrically within the lower ends of the blades 14. The lower blades 22 are generally similar to the upper blades except that their trailing angles are greater so as to continue the rolling action of the material initially caused by the upper blades but at a steeper spiral. In this manner the dry and liquid materials are thoroughly wetted and initially mixed by the upper set of blades 14 and further mixed by a rolling or kneading action by the lower set as well as being transported toward the lower end of the hopper. It should be obvious that the upper set of blades or even one blade alone without the lower set at all could be utilized to both mix, by a spreading smearing action and a rolling action, as well as to transport a tacky dough-like mixture without departing from the scope of the invention. Further, it should be apparent that the blade or blades could be so shaped and disposed as to perform mostly a conveying function where the materials deposited in the hopper were previously mixed into a sticky dough-like compound which resists flow and which must be handled without excessive mechanical shear forces. Such an action is within the scope of the invention and is involved in a transfer device 53 referred to below.

It was found that, to achieve an effective smearing action for initially wetting the materials as well as to achieve a rolling action for further mixing and transport, certain clearances must exist between the blades and the hopper wall. It was also found that, if the clearances were too great, a layer of the smeared material would adhere to the wall. This was thought to be undesirable until it was discovered that such a layer would build up only to the point of forming a resilient lining 23 (FIG. 4) on the hopper wall and the material would then be properly smeared and rolled as desired. Thus, while the clearance between the blades and the wall appears to be critical, it also develops that the clearance is self-adjusting by the initial formation of the resilient lining 23 on the hopper wall. Therefore, it appears that the actual shape of the hopper wall 12 is not a critical factor and need not be concentric with the blade rotation or have the same geometric shape or closely follow the angular disposition of the blades since the outer surface of the lining 23 becomes the wall on which the materials are spread and rolled. Where the molding system as a whole is operating on the same materials, the same lining has been allowed to remain for several weeks at least without adversely affecting the end product. However, the lining has been removed periodically, or whenever materials were changed, simply by moving the crossbars 16 and 20 along the shaft 18 toward the narrow end of the hopper until the blades 14 and 22 cut the lining from the hopper wall. By adjusting the crossbars toward or away from the narrow end of the hopper the clearance between the hopper wall and the blades is easily varied to remove the lining or to form any desired clearance suitable for the materials to be mixed.

The lower end of the hopper is provided with an outlet 24 through which the thoroughly mixed materials can be discharged by the rolling transporting action of the blades alone, if desired. The size of the outlet may be fixed or, if desired, may be varied by adjustment of gate means which may take the form of a single slide or, as shown in FIGS. 2 and 3, may be accomplished by a pair of converging adjustable slide members 26. By restricting the size of the outlet, a back pressure may be applied to the mixture in the lower end of the hopper to vary the intensity of the mixing action of the lower ends of the blades which would act to churn the mixture before it is extruded from the hopper. However, it is generally preferred to discharge the mixture from the hopper at a relatively uniform rate. To this end, a feed screw 28 is secured to the lower end of the shaft 18 so the upper portion of the screw is disposed at least between the blades 22 and the lower end rotates within a tube 30 forming the outlet 24 and extending between the lower end of the hopper and the discharge gate slides 26. Thus, as best seen in FIG. 4, the lower blades 22 act to roll the mixed material into the screw which then transports the mixture from the hopper through the tube 30.

The screw as shown in FIGS. 2 and 3 is secured directly to the shaft 18, so the screw rotates at the same speed as the blades. However, it may be desirable to rotate the screw at a higher speed than the blades either to avoid churning of the mixture in the hopper or at a lower speed to cause a buildup of material in the hopper for a greater mixing action. To this end, the drive for the blades and the screw may be separated as in the modified drive mechanism seen in FIG. 4. As shown therein, the screw is secured to a shaft 32 mounted to rotate within a sleeve 34 on which the crossbars 16' and 20' are secured. The upper end of the shaft 32 has a sprocket 36 driven through a chain by a sprocket 38 on one end of a drive shaft 30 of the motor 40. The other end of the shaft 30 has a sprocket 42 which, through a chain, drives a sprocket 44 secured to the upper end of the sleeves 34. Considering the relative sizes of the various sprockets, it is apparent that the blades 14 and 22 are driven at a higher speed than the screw 28. By changing the sprockets, or by providing separate drives for the shaft and sleeve, the relative speeds of the screw and blades can be varied considerably or, if required, can be reversed to drive the screw faster than the blades. Furthermore, the two sets of blades can be secured to different shafts to provide different blade speeds for the smearing action and the rolling conveying action. While the above provides for the blades to be rotated in the hopper, it is within the scope of the invention to provide for the hopper to be rotated while the blades are stationary and still effect the same mixing-conveying action described.

From the foregoing description, it is seen that the various dry and liquid ingredients are thoroughly wetted by a spreading and smearing action and are further mixed by a rolling-kneading action which is gentle enough to avoid breakage of certain materials such as glass fibers. The total mixing action, however, thoroughly mixes the materials. Such gentle but thorough mixing is particularly adapted for use with a wide variety of materials.

As shown in FIG. 1, and as generally described in application, Ser. No. 101,791, one preferred use of the mixing unit of the present invention involves the mixing of various ingredients for injection molding of reinforced plastic articles. As a general description of such a system, dry materials including reinforcing fibers may be fed by a device 46 (schematically shown) into the upper end of the hopper 10 from an outlet 47 along with liquid resin ingredients from a tank or blender unit 48 (also schematically shown) from a tube 49. The dry and liquid ingredients are mixed as above described and may be discharged from the lower end of the hopper 10 directly into the inlet 50 of a reciprocating screw injection molding machine 52 of any well-known type. The mixture could also be discharged into another mixer for additional mixing with further materials or could be discharged into a transfer device as described below. The injection molding machine 52 shown, as well as other well-known types of molding machines, operates in an intermittent manner so that it may be necessary or desirable to provide means for accepting the mixed material fed continuously from the mixing unit and for transferring the mixture intermittently to the molding machine. To this end, there is provided an accumulating and transfer device 53 (FIG. 2) which is generally similar to the mixing unit 8. The device is provided with a large hopper 54 which, at its upper end, forms an accumulating zone 56 into which the mixture is fed continuously from the mixer outlet 24. The device is also provided with blades 58 mounted on opposite ends of a crossbar 60 secured on a shaft 62 driven in a counterclockwise direction by a motor 64. The blades 58, like the blades 22 of the mixing unit, are adapted mostly to roll the mixture deposited in the hopper spirally along the wall of the hopper 54 toward the lower end of the hopper and into a feed screw 66. The feed screw is secured to the lower end of the shaft 62 so as to rotate with the blades 58 in the same manner as screw 28 and blades 22 of the mixing unit. In this manner, the tacky mixture fed from the mixing unit is accumulated in the transfer device and fed by the blades 58 and screw 66 in a positive manner into the inlet 50 of the injection molding machine 52. The screw 66 and blades 58 may be rotated only when the machine 52 is in a condition to receive the mixture. The transfer mechanism can take alternate forms without departing from the scope of the invention such, for example, as by providing separate drives for the screw and blades. In this manner, the screw and blades could be rotated at different speeds, as described above, with respect to the mixing unit or the blades could be rotated continuously and the screw be intermittently driven when the operation of the injection machine requires transfer of the mixture. Obviously, if the mixing unit is used with a continuously operating molding machine of many well-known types or is used to extrude continuously through a shaped nozzle, then there would be no need for a separate transfer device such as that described above and the delivery screw 28 of the mixing unit would then act to force feed the mixture.

Typically, the injection machine 52 is provided with a screw 70 rotatable in a chamber 72 which transports the moldable mixture to the left end of the screw (as seen in FIG. 1) through a non-return valve 74. As the mixture builds up at the end, the screw is forced back until a predetermined charge is in the end of the chamber. The screw 70 is then stopped and a cylinder 76 at the other end of the screw drives the screw lengthwise, forcing the mixture from the chamber through a nozzle 78 into the cavity 79 of a mold 80. In one preferred embodiment, the mixture is maintained in a substantially non-reactive condition until it is injected into the mold cavity where it is reacted such as by an elevated temperature.

It should be apparent that the above system wtih which the present mixer of the invention is particularly useful is described only by way of example and not by way of limitation. Obviously, a wide variety of injection molding systems could be substituted for the one generally described without departing from the scope of the invention. Furthermore, the mixer could also be used for manufacture of extrusions by providing a shaping nozzle at the discharge outlet of the hopper and also could be used to form bulk type mixtures or blends for storage and subsequent use. In addition, it should be apparent that the mixer could have many uses outside the plastics field such, for example, as in the fields of chemicals, pharmaceuticals and cosmetics generally, in preparation of compounds for tabletting, mixing and homogenizing of various suspensions and emulsions such as ointments and paints and in preparation of ceramic compounds. In the foodstuff industry, the mixer could be used for mixing and homogenizing of various dry blends and viscous substances such as mayonnaise, creams, marmalades and flour products. From the foregoing it should be obvious that the mixing device of the present invention, by various modifications and substitution of equivalent mechanisms, can be used for a wide variety of purposes without departing from the scope of the invention.

Having thus described our invention, what we claim as new and desire to secure by Letters Patent of the United States is:

1. A device for mixing dry and liquid materials including a hopper having one end through which said materials are deposited, and having a wall extending from said one end to a discharge opening at the other end of the hopper, blade means in the hopper and extending along said wall generally toward said opening, means for causing relative movement between the hopper wall and the blade means for causing the blade means to spread said materials along the wall in a direction leading toward the discharge opening whereby the dry materials are wetted with the liquid materials with a smearing action as they are spread on said wall and the wetted mixture of materials is rolled by the blade means along said wall toward the discharge opening for further mixing by a kneading action and for discharge from the discharge opening.

2. A device according to claim 1 in which the hopper wall and the blade means are concentrically arranged about a common axis and the relative movement occurs about said axis so said materials are spread and rolled spirally along said wall toward said discharge opening.

3. A device according to claim 1 and also including means for varying the size of the discharge opening for varying the mixing action by restricting the rate of material discharge causing a build-up of said mixture which is further mixed before discharge.

4. A device according to claim 1 and also including a rotating screw leading to the discharge opening and into which said mixed materials are rolled for conveying the mixture through the discharge opening.

5. A device according to claim 1 in which the blade means includes at least one blade extending substantially parallel to and along said wall in a direction generally transversely and angularly disposed with respect to the direction of said relative movement.

6. A device according to claim 1 in which the blade means extends substantially parallel to and is spaced sufficiently from said wall to cause the materials initially spread on the wall to adhere to the wall and form a lining thereon until the space between the outer surface of the lining and the blade becomes sufficiently narrow to cause the materials spread on said surface to be rolled along said surface by the blade.

7. A device for mixing dry and liquid materials including blade means rotatable about an axis, a hopper within which the blade means rotate and having one end through which said materials are deposited, and a wall concentric with said axis and extending from said one end to a discharge opening at the other end of the hopper, means for rotating said blade means for spreading said materials along the hopper wall in a spiral direction leading toward said discharge opening whereby the dry materials are wetted with the liquid materials with a smearing action as they are spread on said wall and the wetted mixture of materials is rolled by the blade means along said wall spirally toward said opening for further mixing by a kneading action and for discharge from said discharge opening.

8. A device according to claim 7 and also including means for varying the size of the discharge opening for varying the mixing action by restricting the rate of material discharge causing a build-up of said mixture which is further mixed before discharge.

9. A device according to claim 7 and also including a rotating screw coaxial with said axis and leading to the discharge opening for conveying the mixture through said opening.

10. A device according to claim 9 in which means are provided to vary the speed of rotation of the screw to vary the mixing action.

11. A device according to claim 9 in which the blade means includes at least one blade extending lengthwise of said wall toward the discharge opening at an angle to said axis and being disposed at an acute angle with respect to said wall for first spreading said materials on the wall for initial mixing and thereafter rolling said materials spirally along said wall for further mixing and transport to the screw for discharge through said opening.

12. A device according to claim 7 in which the blade means includes at least one blade extending lengthwise of said wall toward the discharge opening and at an angle to said axis so the end of the blade toward said discharge opening trails the other end with respect to the direction of rotation of the blade to cause the mixture to roll along the wall after it is spread by the blade.

13. A device according to claim 12 in which the blade is spaced sufficiently from the hopper wall to cause the materials initially spread on the wall to form a lining on the wall until the space between the outer surface of the lining and the blade becomes sufficiently narrow to cause the materials spread on the surface of the lining to be rolled along said surface by the blade.

14. A device according to claim 7 in which the hopper wall is substantially in the form of a truncated cone with the narrow end adjacent the discharge opening.

15. A device according to claim 14 in which the blade means is adjustable along said axis to vary the space between the blade means and the hopper wall.

16. A device according to claim 7 in which the blade means includes at least two diametrically opposed blades extending lengthwise of the hopper wall toward the discharge opening and at an angle to said axis adapted to spread and roll the materials spirally along the wall.

17. A device according to claim 16 in which at least two sets of said diametrically opposed blades are provided, one set of blades being disposed at an angle with the hopper wall adapted to spread the materials on the wall and the other set being disposed closer to the discharge opening and at an angle with respect to said wall adapted to cause the spread materials to roll along the wall in a spiral direction toward said outlet.

18. A method for mixing dry and liquid materials into a viscous dough-like mixture including the steps of spreading the wet and dry materials in a smearing action along a surface for initial wetting and mixing and thereafter rolling the smeared mixture which resists transport along said surface for further thorough mixing by a rolling-kneading action.

19. A method according to claim 18 including providing a hopper having a conical wall which provides said surface and the rolling step comprises rolling the materials in a spiral direction toward an outlet in the narrow end of the conical wall.

20. A method according to claim 19 including providing one or more blades spaced from said wall surface, moving the blade along the wall for performing the spreading step and forming a layer of materials spread on said wall surface to provide a lining on said surface until said spread materials are caused to roll along said lining.

21. A device for transporting viscous material including a hopper having a surface which extends from one end on which said material is deposited to the other end of the hopper having a discharge outlet, blade means extending generally parallel to said surface and in direction generally leading toward said outlet, and means for causing relative movement between said surface and said blade means about a common axis whereby material deposited on said end is rolled along the wall toward said outlet for discharge.

22. A device according to claim 21 in which the blade means includes at least one blade extending transversely and angularly with respect to the direction of said relative movement whereby said material is rolled spirally along said surface toward said outlet.

23. A device according to claim 21 in which said surface is substantially in the form of a truncated cone and forms a hopper into the wider end of which said material is deposited and the narrow end is open to provide a discharge outlet through which the material is fed.

24. A device according to claim 23 in which the blade means is spaced sufficiently from said surface to cause the material to be spread initially on the surface to adhere thereto and form a lining thereon until the space between the outer surface of the lining and the blade means is sufficiently narrow to cause the material to be rolled by said blade means.

25. A device according to claim 21 and also including a rotatable screw coaxial with said axis and leading toward said discharge outlet, said material being rolled into the screw by the blade means and conveyed by the screw through said outlet.

26. A device according to claim 25 in which the screw is operable intermittently whereby material fed onto said surface is accumulated and charges of the material are fed intermittently by the screw.

27. A device for transporting viscous material including a hopper having a conical wall on which said material is deposited through the wider end of the hopper, blade means extending substantially parallel to said wall and movable about an axis coaxial with said hopper wall to roll the material along the wall, a screw rotatable about said axis and leading toward a discharge outlet at the narrow end of the hopper, said material being rolled into the screw by the blade means and conveyed by the screw through said outlet, and means for rotating said blade means and said screw at different speeds about said axis.

28. A device according to claim 27 in which the rotating means for the blade means is operated substantially continuously to continuously roll the material deposited in the hopper, and the rotating means for the screw is operated intermittently to discharge said material intermittently from the hopper outlet.

29. A device according to claim 28 in which the wider end of the hopper forms an accumulating zone in which material is collected as it is deposited in the hopper in a substantially continuous manner and the screw acts to feed successive charges of the material intermittently from the hopper.

30. A method for transporting a viscous dough-like material including the steps of depositing said material on a conical surface, and rolling said material along said surface in a spiral direction toward an outlet in the narrow end of said conical surface.

31. A method according to claim 30 including providing an accumulating zone on said surface for collecting material deposited thereon and intermittently discharging charges of said material from said surface.

* * * * *